United States Patent [19]

Nattel

[11] Patent Number: 4,575,133

[45] Date of Patent: Mar. 11, 1986

[54] CONDUIT CONNECTOR

[75] Inventor: William Nattel, Montreal, Canada

[73] Assignee: Commander Electrical Materials, Inc., Quebec, Canada

[21] Appl. No.: 644,360

[22] Filed: Aug. 27, 1984

[30] Foreign Application Priority Data

May 18, 1984 [CA] Canada .................................. 454760

[51] Int. Cl.[4] ............................................. F16L 39/00
[52] U.S. Cl. .................................... 285/319; 285/192; 285/208; 285/417; 285/423; 285/DIG. 4; 285/DIG. 22
[58] Field of Search ................. 285/319, 192, DIG. 4, 285/DIG. 22, 423, 417, DIG. 7, 205, 208

[56] References Cited

U.S. PATENT DOCUMENTS

| 1,106,761 | 8/1914 | Weikert et al. | 285/205 X |
| 2,160,353 | 5/1939 | Conners | 285/194 |
| 4,247,136 | 1/1981 | Fouss et al. | 285/319 |
| 4,248,459 | 2/1981 | Pate et al. | 285/319 |
| 4,286,808 | 9/1981 | Fouss et al. | 285/DIG. 22 |
| 4,441,745 | 4/1984 | Nicholas | 285/DIG. 22 |
| 4,480,855 | 11/1984 | Rosenbaum | 285/DIG. 22 |

Primary Examiner—Richard J. Scanlan, Jr.
Attorney, Agent, or Firm—Larson and Taylor

[57] ABSTRACT

A connecting member for use in connecting a corrugated conduit to another member. The connecting member has a wall defining a cylinder with circular ends. At least one of the ends is a conduit entry end. A resilient finger is mounted by one end in an opening in the wall. The free end of the finger has a projection extending radially of the wall. The conduit is mounted in the connecting member and held there by the projection cooperating with a rib of the conduit.

4 Claims, 9 Drawing Figures

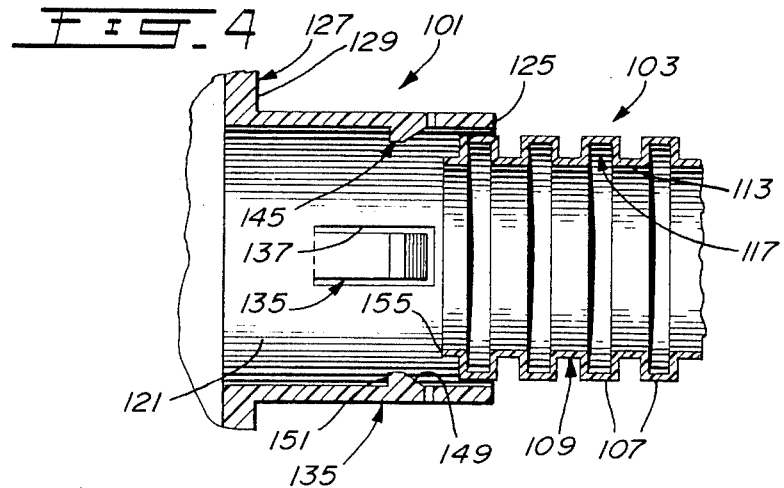
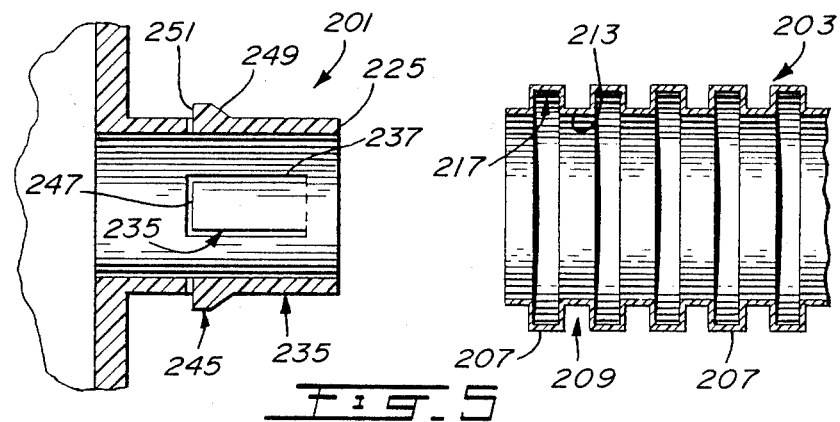
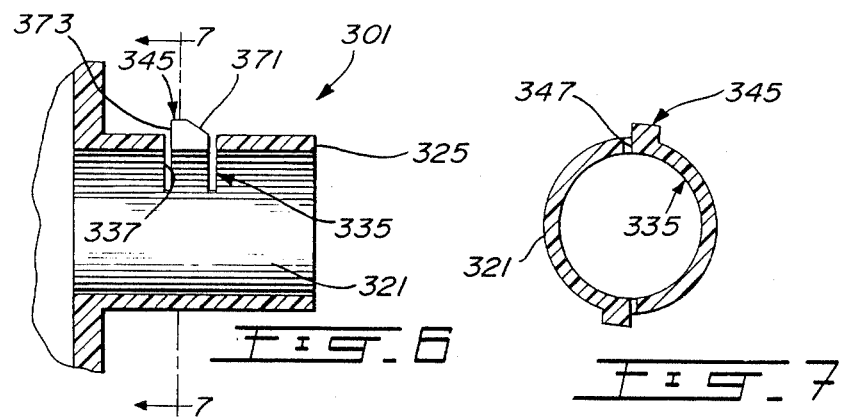

CONDUIT CONNECTOR

This invention is directed toward a connecting member for use in connecting corrugated conduit to another member.

Corrugated conduit has started to replace plain electrical conduit. The corrugated electrical conduit is defined by a series of longitudinally spaced-apart circular ribs on its outer surface and a series of longitudinally spaced-apart circular ribs on its inner surface. The conduit is normally extruded from plastic material and is light-weight, flexible and easy to work with while providing the required protection for the electrical wires or cable it carries.

The corrugated electrical conduit is not however entirely suitable for use with the electrical connectors and/or couplings presently used. The known connectors and/or couplings normally employ separate fasteners to connect the conduit to the connector or coupling. The known connectors or couplings are thus relatively expensive and often require the use of tools to make the connection. It is also known to fasten the plastic corrugated conduit to connectors with cement. This method is however quite slow.

It is known to use connectors for conduit or cable which do not employ separate fasteners. Examples of such connectors are shown by way of example in U.S. Pat. Nos. 2,823,932 and 3,369,071. In these connectors, lug or tongue members are formed from the wall of the connector, and moved out of the boundaries of the wall to cooperate with a conduit to hold the conduit to the connector. The lug or tongue members are however, normally fixed in position relative to the wall and thus are not useful in connecting corrugated plastic conduit to the connector. The ribs on the corrugated conduit could not pass the lugs or tongues.

It is known to use connectors with resilient means for use in connecting corrugated plastic conduits together. Examples of such connectors are shown in U.S. Pat. Nos. 3,897,090 and 4,247,136. These connectors employ lugs or projections which cooperate with the ribs on the conduit to hold the conduit and connector together. In U.S. Pat. No. 3,897,090 the lugs are positioned radially relative to the ribs as a result of the flexibility of the connector wall. This feature however makes it difficult to move a conduit into the connector. In U.S. Pat. No. 4,247,136 the lugs or projections are flexibly mounted on the wall of the connector. However their location still requires flexing of the connector wall in order to mount a conduit on the connector and mounting is thus somewhat difficult. In both cases, the connector wall must be flexible thus weakening it.

It is the purpose of the present invention to provide an improved connector for use in connecting corrugated conduit to another member. More particularly, it is the purpose of the present invention to provide an improved connector to which corrugated conduit can be easily mounted, yet securely retained. The mounting can be accomplished without the use of tools and/or cement.

In accordance with the present invention there is provided a connector having a wall with openings therein and with resilient fingers in the openings and mounted at one end to the wall. Each finger has a projection at its free end that extends radially past the wall. The projections cooperate with the ribs on a corrugated conduit to hold the conduit to the connector. With the projections on the free ends of resilient fingers on the connector, the ribs of the conduit slide easily past the projections when mounting the conduit to the connector. The ribs cam the projections out of the way allowing the ribs to pass the projections. When the projections are cammed by the ribs, the resilient fingers allow the projections to move radially relative to the wall of the connector.

To facilitate the camming action of the ribs on the projections, the projections are provided with a camming surface on the end of the projections which first encounter the conduit. A stop surface is provided on the other end of the projections to retain the conduit and connector together.

Since the projections are mounted on resilient fingers, the connector wall can be made rigid rather than flexible thus providing a strengthened connector. The connector of the present invention can be employed with an electrical box, mounted directly on it, or integrally formed with it. The connector can also comprise a coupling to join two conduit sections together.

The invention is particularly directed toward a connecting member for use in connecting a corrugated conduit to another member. The conduit is of the type having longitudinally, spaced-apart, circular ribs on its inner and outer surfaces. The connecting member has a cylindrical wall with circular ends with at least one of the ends forming a conduit entry end. At least one opening is provided in the wall with a resilient finger in the opening and connected at one end to the wall. The finger has a projection on its other free end, the projection extending radially past the wall to cooperate with a rib on the conduit, when the conduit is mounted on the member, to hold the conduit on the member.

The invention will now be described in detail having reference to the accompanying drawings in which:

FIG. 4 is a cross-section view of a modified connector;

FIG. 5 is a cross-section view of another connector embodiment;

FIG. 6 is a cross-section view of yet another connector embodiment;

FIG. 7 is a cross-section view taken along line 7—7 of FIG. 6;

Figure 1:
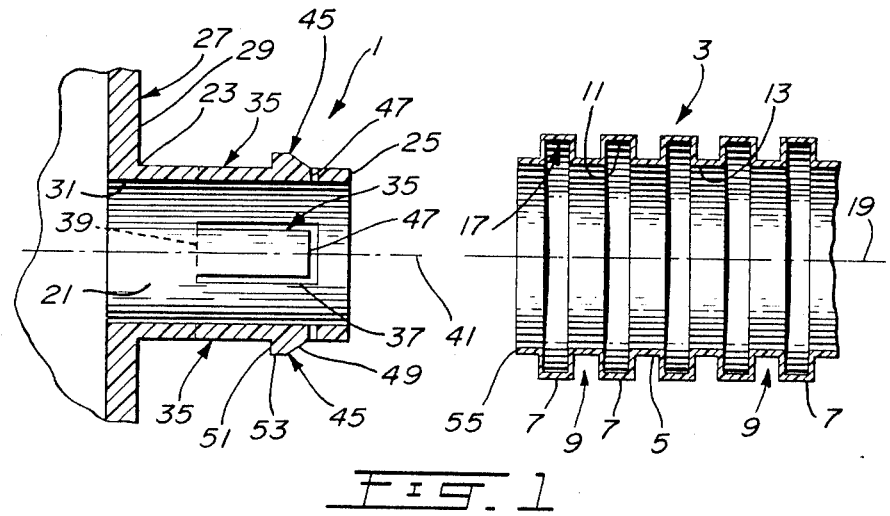
FIG. 1 is a cross-section view of the connector, and a conduit to be mounted on the connector.

The connecting member 1 of the present invention, as shown in FIG. 1, is designed to receive a plastic, corrugated conduit 3. The conduit 3 is of the type having an outer cylindrical surface 5 with a series of longitudinally spaced-apart ribs 7 extending outwardly from the outer surface 5. Channels or grooves 9 are formed between the outer ribs 7. The conduit 3 can also be said to have an inner cylindric surface 11 with a series of longitudinally spaced-apart ribs 13 extending inwardly from its inner surface 11. Channels or grooves 17 are formed between the inner ribs 13. The inner ribs 13 define the outer grooves 9 and the outer ribs 7 define the inner grooves 17. The ribs 7, 13 are circular, extending transverse to the longitudinal axis 19 of the conduit 3, and each has a rectangular or trapezoidal, cross-sectional shape.

The connecting member 1 is relatively short and tubular having a cylindrical wall 21 with ends 23, 25. In one embodiment, one end 23 of the connecting member 1 is connected to an electrical box 27. More particularly, the one end 23 of the connecting member 1 is connected to an end wall 29 of the box 27, aligned with an access opening 31 in the wall 29 of the box. Preferably, the connecting member 1 and box 27 can be moulded in one unit from suitable plastic material. The other, free end 25 of the member 1 fits into one end of the conduit 3 as will be described.

At least one resilient finger 35 forms part of the connecting member 1. The finger 35 is located in an opening 37 in the wall 21 of the member 1 and is connected at one end 39 (shown in dotted lines) to the wall 21. The finger 35 extends in a direction parallel to the longitudinal axis 41 of the member 1 and is movable, about its one end 39, in a direction extending radially from the axis 41. The finger 35 extends toward the free end 25 of the member 1 from its one end 39.

The finger 35 has a projection 45 on its free end 47 opposite end 39. The projection 45 extends outwardly past the plane of the outer surface of the cylindrical wall 21. The projection has a sloping cam surface 49 on its end nearest the free end 25 of the member 1, and a straight stop surface 51 on its end farthest from the free end 25. The outer side 53 of the projection 45, joining the two ends 49 and 51 is narrower than any one of the inner grooves 17 on the conduit 3 thus allowing the projection 45 to enter into any one of the grooves 17. Preferably four identical resilient fingers 35 are provided on the connecting member 1, equally spaced-apart about the member and parallel to each other. The fingers 35 are formed integrally with the wall 29 of the member 1.

Figure 2:
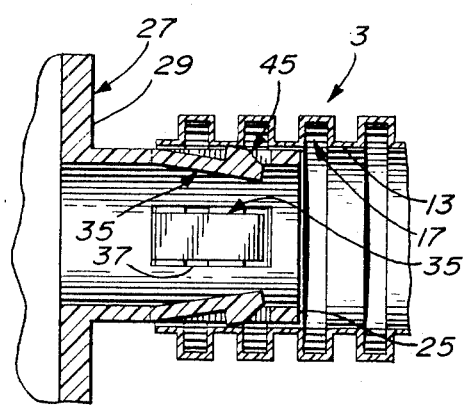
FIG. 2 is a cross-section view showing the conduit being mounted on the connector.
Figure 3:
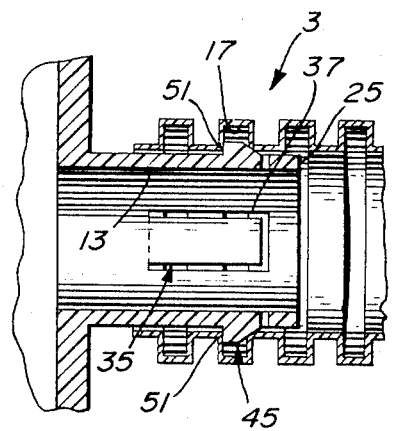
FIG. 3 is a view similar to FIG. 2 but with the conduit now mounted in place.

In use, to connect a conduit 3 to the electrical box 27, one end 55 of the conduit 3 is slipped over the free end 25 of the connecting member 1 on the box 27. The inner diameter of the conduit, defined by the diameter of the innermost surface of any one inner rib 13 is just slightly larger than the outer diameter of the connecting member 1. As the conduit 3 is moved over the member 1 to position its end 55 near or adjacent the wall 29 of the box 27, its inner ribs 13 pass over the projection 45 on each finger 35 camming the fingers as shown in FIG. 2 inwardly, through the camming surface 49 on the projections. As the conduit end 55 approaches the box wall 29, the projections 45 move into an inner groove 17 one last time as shown in FIG. 3. Each stop surface 51 on the projections cooperates with the inner rib 13 adjacent to it, to prevent the conduit 3 from being removed from the connecting member 1 thereby securely locking it to the box 27. Since the projections 45 are mounted on the free ends of resilient cantilevered fingers 35, they are easily cammed out of the way by the passing ribs 13, springing back each time into the next groove 17. With the fingers 35 being resilient, the wall 21 of the connecting member 1 can be rigid to provide a strong connection.

Another embodiment of the invention is shown in FIG. 4 using reference characters the same as those used in the first embodiment shown in FIGS. 1 to 3 but increased by one hundred. The connecting member 101 can be sized to fit over the conduit 103 rather than within it. In this embodiment, the resilient fingers 135 are formed in the openings 137 to have their projections 145 extending inwardly of the plane of the inner surface of the cylindrical wall 121, rather than outwardly. Now, as the free end 155 of the conduit 103 is pushed into the connecting member 101 from its free end 125, the outer ribs 107 on the conduit cam the fingers 135 outwardly via the cam surfaces 149 on their projections 145.

As the end 155 of the conduit 103 nears wall 129 of box 127, the projections 145 will enter an outer groove 109 on the conduit one last time. The stop surfaces 151 cooperate with the adjacent outer rib 107 to prevent removal of the conduit 103 from the member 101.

In a further embodiment of the invention, shown in FIG. 5, the connecting member can be modified to provide a connecting member 201 having one or more resilient fingers 235 extending in a direction away from the free or entry end 225 of the member 201 rather than toward it. In this embodiment, each finger 235 has an outwardly extending projection 245 as before but with a cam surface 249 now on the side farthest from its free end 247 and thus nearest the free end 225 of the member 201. The stop surface 251 is still farthest from the free end 225 of the member 201 but now nearest the free end 247 of the finger. As a conduit 203 is slipped over the connecting member 201 its first inner rib 213 cams the fingers 235 inwardly. The fingers 235 move back out after rib 213 passes, and the stop surfaces 251 cooperate with the first or second rib 213 to hold the conduit 203 on the member 201.

The projections 245 can also project inwardly in the same manner as projections 145 shown in FIG. 4. In this embodiment, with the fingers 235 extending away from the free end 225 of the connecting member 201, and the projections 245 extending radially inwardly, the stop surfaces 251 will cooperate with the first or second outer ribs 207 on the conduit 203 to hold the conduit and connecting member 201 together.

A further embodiment, shown in FIGS. 6 and 7 has the connecting member 301 provided with one or more resilient fingers 335 which extend circumferentially rather than longitudinally to the member. Each finger 335 is curved and normally lies in the plane of the wall 321 of the member 301 except for the projection 345 on the free end 347 of the finger 335. The projection 345 extends outwardly past the wall 321 of the member 301 and differs from the other projections in having a camming surface 371 on the side of the projection 345 nearest the free end 325 of the member 301. The stop surface 373 is on the opposite side of the projection 345 farthest from the free end 325. As a conduit is moved over the connecting member 301, its inner ribs cam the fingers 335 inwardly via the side cam surfaces 371 until the projections 345 reach an appropriate inner groove in conduit.

The projections 345 could also extend inwardly, rather than outwardly as shown in FIGS. 6 and 7, in the manner of the projections 145 shown in FIG. 4. In this embodiment, the inwardly directed projections 345 on the curved fingers 335 cooperate with outer ribs and grooves on the conduit.

Figure 8:
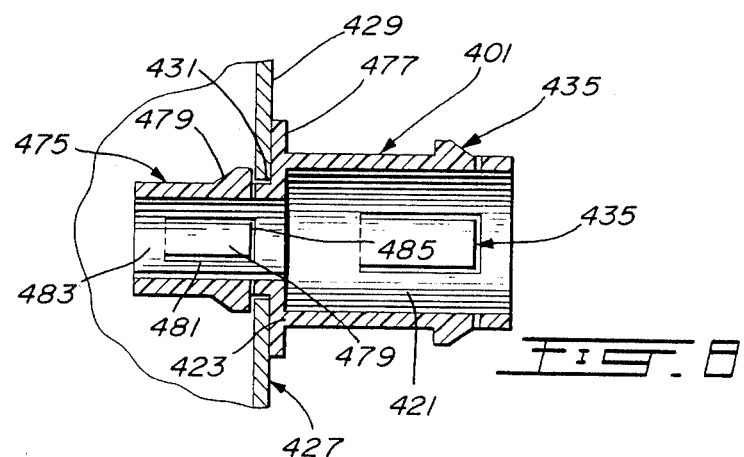
FIG. 8 is a cross-section view of a separate connecting member.

In all the above embodiments the connecting member 1, etc. is shown forming an integral part of an electrical box 27 etc. The connecting member can however be separate from the box 27 if desired. In this embodiment, as shown in FIG. 8, the connecting member 401 can be similar to the connecting member 1 but with a tubular extension 475 projecting from the outer end 423 of the cylindrical wall 421. The extension 475 is sized to pass through an access hole 431 in the wall 429 of an electrical box 427. A flange 477 connects the tubular extension 475 to the end 423 of the cylindrical wall 421. Resilient fingers 479, similar to fingers 435, are provided in openings 481 in the wall 483 of the tubular extension 475. The fingers 479 extend toward the flange 477 terminating in a free end 485. An outwardly extending projection 487 is provided on the free end 485 of the fingers 479.

In use, the connecting member 401 is mounted on the box wall 429 by passing the extension 475 through the access hole 431 in the wall. The fingers 479 in the extension 475 are cammed inwardly and then snap outwardly once the wall 429 is passed to securely fasten the wall between the fingers 479 and the rib or flange 477. A conduit can now be mounted on the cylindrical wall 421 of the connector, using resilient fingers 435, in the same manner as a conduit is mounted on connector 1.

The connecting member 401 can be provided with the resilient fingers 435 on the cylindrical wall 421 extending in either longitudinal direction or circumferentially and with the projections extending outwardly or inwardly. Where the projections extend inwardly, the tubular extension 475 can be made smaller in diameter than the diameter of the cylindrical wall 421, or the same size or larger. When the extension is smaller, the conduit is kept outside the box. When the extension is the same size or larger, the conduit can pass directly into the box.

Figure 9:
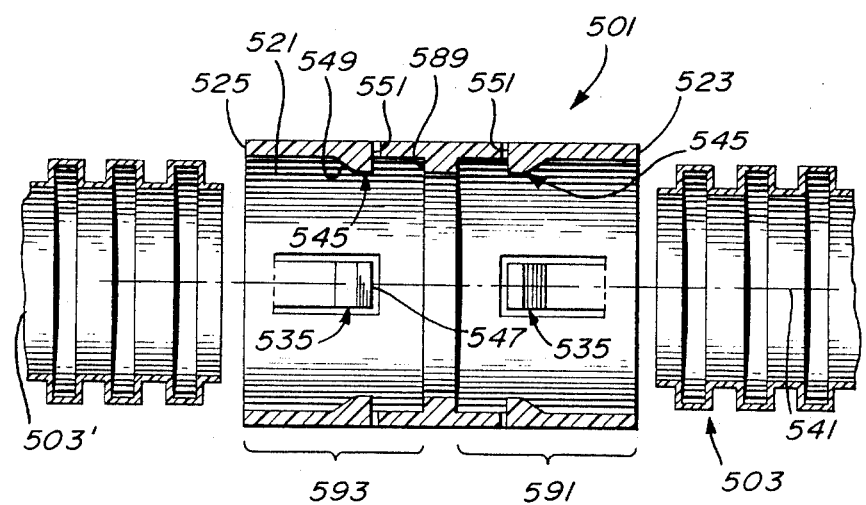
FIG. 9 is a cross-section view of a coupling according to the present invention.

The connecting member can also be in the form of a coupling 501 as shown in FIG. 9. The coupling 501 is used to join two conduits 503, 503$^1$ together. The coupling 501 has a short tubular body defined by a cylindrical wall 521 and two free ends 523, 525. A circular stop rib 589 projects inwardly of the wall 521 midway of the ends 523, 525 to divide the coupling into two sections 591, 593. At least one resilient finger 535 is provided in an opening 547 of each section 591, 593. Each finger 535 in each section 591, 593 extends parallel to the longitudinal axis 541 of the coupling 501 and has its free end 547 nearest the stop rib 589. The projection 545 at the free end 547 of each finger 535 extends inwardly and has its stop surface 551 nearest the stop rib 589 and its camming surface 549 farthest from the stop rib 589.

One conduit 503 is pushed into the section 591 of coupling 501 from one end 523 to have its end come close to the stop rib 589. The resilient finger 535 in the section 591 of the coupling holds the conduit 503 in place. The other conduit 503$^1$ is pushed into the other section 593 of the coupling 501 from the other end. This conduit 503$^1$ is also held in place by the one or more resilient fingers 535 on the section 593.

The fingers 535 could also extend away from the stop rib 589 rather than toward it with the projections on these fingers extending inwardly or outwardly.

The fingers 535 could also extend circumferentially in each coupling section with the projections, now having the camming and stop surfaces on the sides, extending inwardly or outwardly.

The embodiments of the invention in which an exclusive property or privilege is claimed are defined as follows:

1. A connecting member for use in connecting a corrugated conduit to another member, the conduit being of the type having longitudinally spaced-apart, circular ribs on its inner and outer surfaces, the connecting member having:
    a cylindrical wall with circular ends, at least one of the ends forming a conduit entry end;
    at least one opening in the wall;
    a resilient finger in each opening and connected at one end to the wall;
    said finger extending in a circumferential direction, transverse to the central, longitudinal axis of the member;
    the finger having a projection at its other free end, the projection extending radially past the wall to cooperate, when the conduit is mounted on the member, with a rib on the conduit to hold the conduit on the member.

2. A connecting member as claimed in claim 1 wherein the projection at the free end of the finger extends radially outwardly.

3. A connecting member as claimed in claim 2 wherein the projection has a camming surface on its side nearest the entry end of the member, and a stop surface on its side farthest from the entry end.

4. A connecting member as claimed in claim 1 wherein the projection has a camming surface on its side nearest the entry end of the member, and a stop surface on its side farthest from the entry end.

* * * * *